(12) United States Patent
Boland et al.

(10) Patent No.: US 8,286,233 B1
(45) Date of Patent: Oct. 9, 2012

(54) APPARATUS AND METHOD FOR PREVENTING EAVESDROPPING

(75) Inventors: Simon Boland, Pennant Hills (AU); Jonathan R. Yee-Hang Choy, Wahroonga (AU); Paul Thomas McNamara, Killarney Heights (AU)

(73) Assignee: Avaya Inc., Basking Ridge, NJ (US)

( * ) Notice: Subject to any disclaimer, the term of this patent is extended or adjusted under 35 U.S.C. 154(b) by 2010 days.

(21) Appl. No.: 11/084,583

(22) Filed: Mar. 19, 2005

(51) Int. Cl.
*G06F 21/02* (2006.01)
*G06F 9/00* (2006.01)
*G06F 13/00* (2006.01)

(52) U.S. Cl. .............. 726/17; 726/2; 726/3; 726/21; 726/23; 726/24; 726/27; 726/29; 713/176; 713/187; 713/188; 340/853.2; 705/34; 707/783

(58) Field of Classification Search .............. 726/25
See application file for complete search history.

(56) References Cited

U.S. PATENT DOCUMENTS

| 7,111,307 B1 * | 9/2006 | Wang ..................... 719/321 |
| 7,392,541 B2 * | 6/2008 | Largman et al. .......... 726/17 |
| 2002/0133711 A1 * | 9/2002 | Peretti ..................... 713/193 |
| 2003/0089675 A1 * | 5/2003 | Koestler ................... 213/201 |
| 2003/0159070 A1 * | 8/2003 | Mayer et al. ............. 713/201 |
| 2006/0117384 A1 * | 6/2006 | Larson et al. ............ 726/22 |

* cited by examiner

*Primary Examiner* — Nathan Flynn
*Assistant Examiner* — Bryan Wright
(74) *Attorney, Agent, or Firm* — John C. Moran

(57) ABSTRACT

A method and apparatus prevent eavesdropping via a computer by detecting and alerting if more than one authorized driver is controlling a interface circuit that is providing audio or video input information. Further, prevention is performed by detecting and alerting if more than one authorized application programming interface is receiving audio or video input information from an authorized driver. Also, prevention is performed by detecting and alerting if more than one authorized software application is receiving audio or video input information from an authorized driver. In addition, prevention is performed by detecting and alerting upon first receipt of audio or visual information by an authorized software application via an authorized application programming interface and authorized driver.

10 Claims, 4 Drawing Sheets

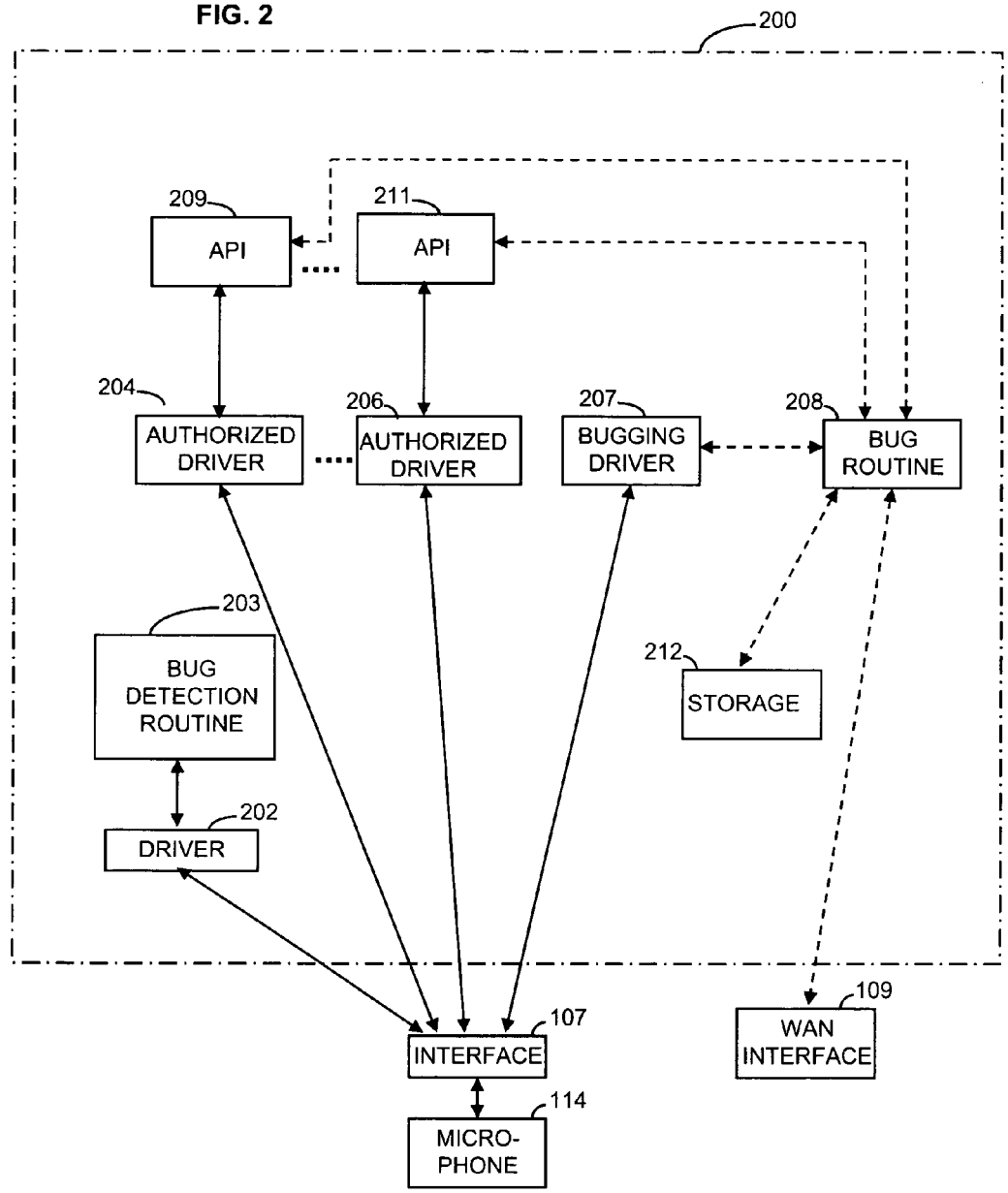

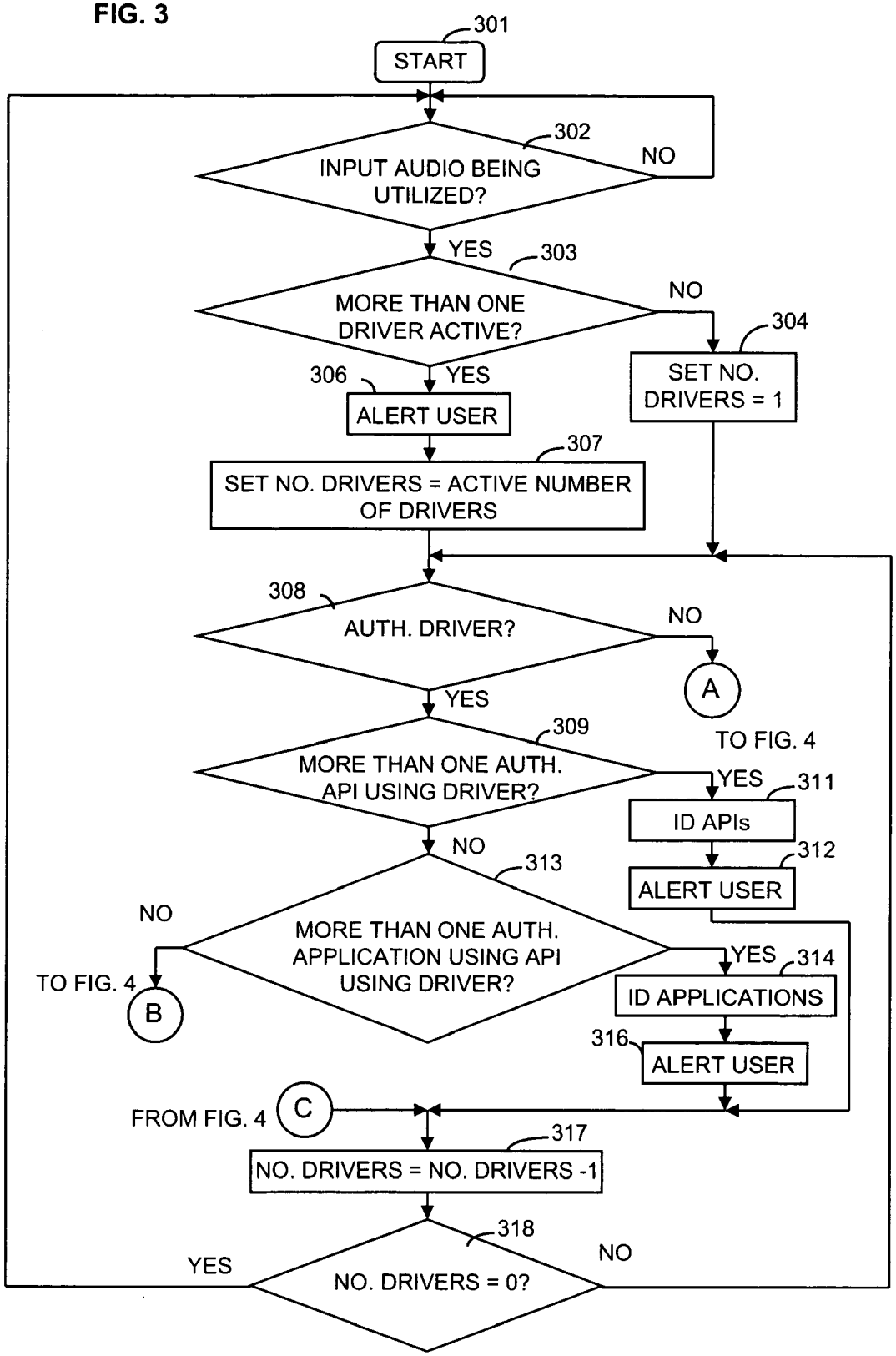

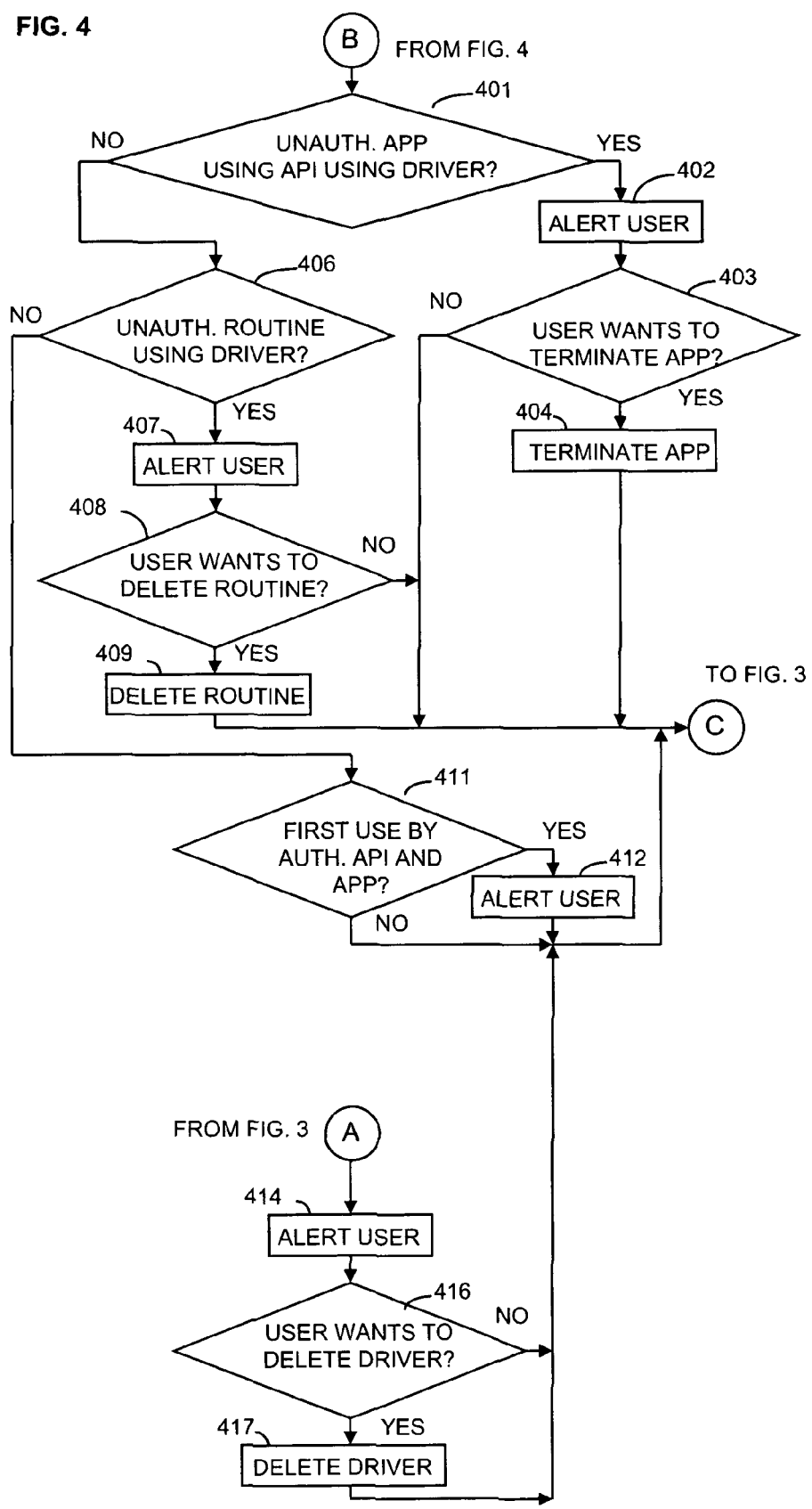

APPARATUS AND METHOD FOR PREVENTING EAVESDROPPING

TECHNICAL FIELD

This invention relates to the protection of privacy of computer users.

BACKGROUND

Computers, such as personal computers, are subject to a variety of attacks from individuals over networks such as the Internet or Intranet. The implanting of viruses in personal computers causing the personal computer to either fail or send large amounts of email is a common type of attack. Another type of attack that is becoming increasingly prevalent is that of using a personal computer to eavesdrop on the owner of that personal computer either via audio or video information. This information is transmitted from the user's personal computer to the individual who is performing the eavesdropping. This is done by inserting a routine into the personal computer that captures audio information from a microphone attached to the computer and/or video information from a camera attached to the personal computer. In certain types of personal computer applications such as IP telephony or Net Meeting Services, the individual wishing to eavesdrop on a user's computer simply initiates one of these services and directs the information to the individual's computer. Also, the individual may simply use a legitimate application programming interface (API) to eavesdrop with the chosen API directing audio and/or video to a bugging application that had been inserted into the user's computer. Examples of such API may be but is not limited to Microsoft IP Telephone Programming Interface or Avaya IP Softphone Telephone Programming Interface.

Another way to eavesdrop utilizing a user's personal computer is to insert a routine into the personal computer that monitors the audio and/or video inputs and transmits these to an individual's computer. This type of eavesdropping is extremely difficult to detect whereas it is reasonably easily implemented.

Existing prior art solutions to preventing damage or illegal use of personal computers is done using virus scanners and firewalls. Whereas both of these techniques provide some protection against eavesdropping, they are not a fail safe mechanism.

SUMMARY

A method and apparatus prevent eavesdropping via a computer by detecting a use of at least one of audio or visual input information by a software entity; determining if the software entity is authorized to receive the input information and; alerting upon the software entity being unauthorized.

BRIEF DESCRIPTION OF THE DRAWING

FIG. 2 illustrates an embodiment detailing the processes and routines relative to the detection and bugging of a user's computer; and FIGS. 3 and 4 illustrates, in flow chart form, operation performed by an embodiment.

DETAILED DESCRIPTION

Figure 1:
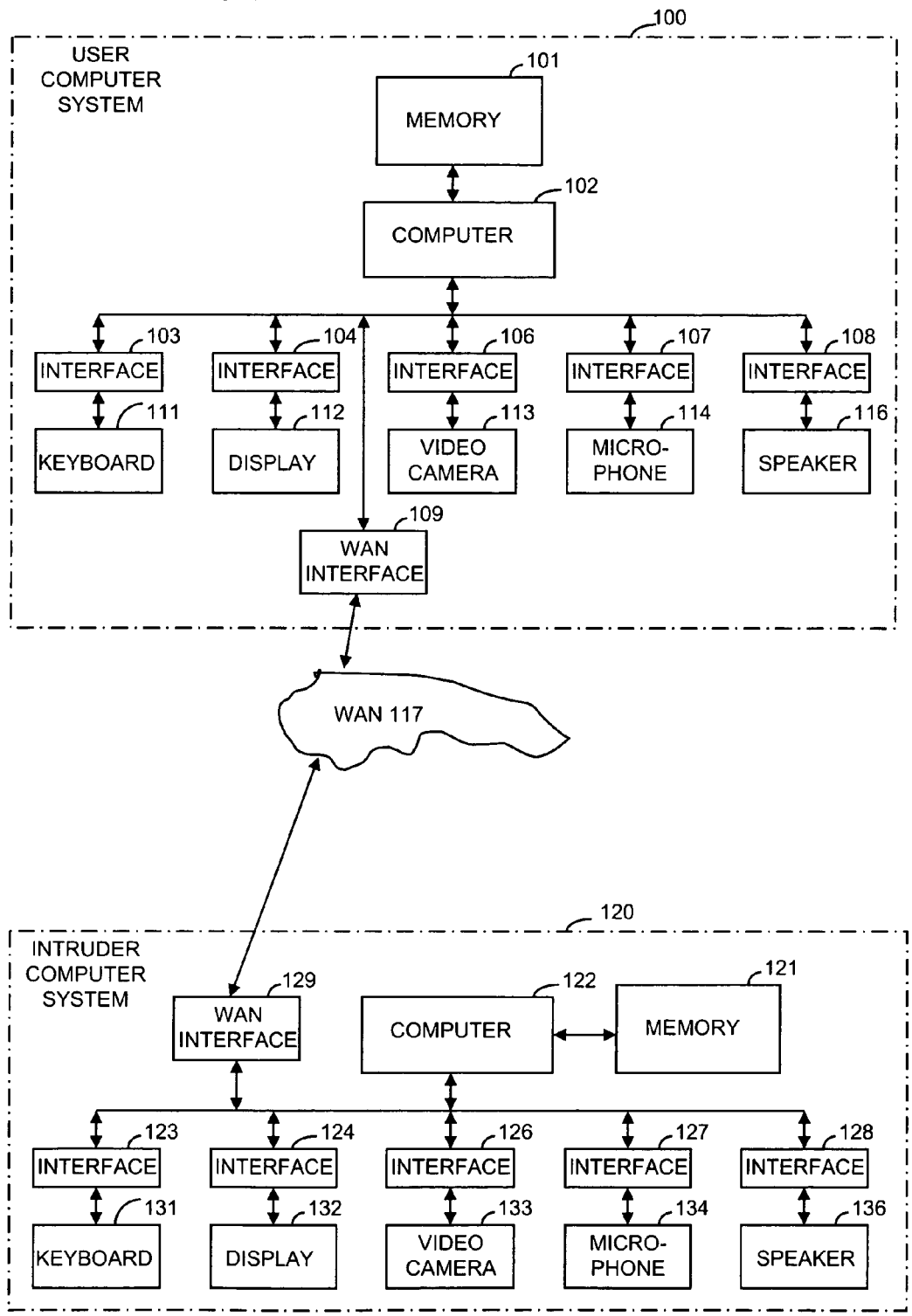
FIG. 1 illustrates an embodiment having two computer systems interconnected via a wide area network (WAN)

FIG. 1 illustrates, in block diagram form, an embodiment that illustrates user computer system 100 interconnected to intruder computer system 120 via wide area network (WAN) 117. WAN 117 may be a local area network (LAN), Internet, Intranet, or any other type of network utilized for interconnecting computer systems. In the following examples, user computer system 100 is utilized by the individual controlling intruder computer system 120 to eavesdrop on the activities of the user of user computer system 100. User computer system 100 and intruder computer system 120 may be identical or similar or have different components. User computer system 100 must provide the necessary input devices so that audio or video information can be recorded so that it can be transmitted to intruder computer system 120 via WAN 117.

In one embodiment, intruder computer system 120 opens a valid application such as an IP telephony or Net Meeting application to perform the eavesdropping. By opening one of these applications, information from microphone 114 or video camera 113 is transmitted to intruder computer system 120 via WAN 117.

In another embodiment, intruder computer system 120 puts a hidden routine into memory 101 of user computer system 100. This hidden routine then enables the utilization of microphone 114 or video camera 113 so that information concerning the user of computer system 100 can be captured. This captured information is then transmitted to intruder computer system 120 via WAN 117. The captured information may be transmitted as received or stored for later transmission in memory 101 that may comprise RAM memory, hard drive storage, etc. This hidden routing may receive the information from a legitimate API or may insert a driver into computer system 100 to receive the information directly from interface circuit 107 or 106 connected to microphone 114 or video camera 113, respectively.

Computer 102 functions by executing and storing data out of memory 101. The user of user computer system 100 utilizes devices 111-116 that are interfaced to computer 100 via interfaces 103-108, respectively, to provide and receive information from computer 102. WAN interface 109 interfaces computer 102 to WAN 117. One skilled in the art could readily envision that there could be a plurality of interface circuits such as interface circuits 126 and 127. Intruder computer system 120 is illustrated as having similar components. Components 123-136 correspond in operations to components 103-116. WAN interface 129 performs similar functions to those performed by WAN interface 109.

In one embodiment, intruder computer system 120 under control of the program being executed in memory 121 by computer 122 utilizes an IP telephony or Net Meeting application to activate microphone 114 and/or video camera 113 in user computer system 100. The information received from input devices 114 or 113 is then relayed to intruder computer system 120 by the opened application in user computer system 100. The information received from user computer system 100 then can be displayed by intruder computer system 120 on display 132 if it is video information or played on speaker 136 if it is audio information.

In the other embodiment, intruder computer system 120 utilizes a variety of methods well known to those skilled in the art to insert a routine into memory 101 of user computer system 100. This routine, referred to as a bug routine, then activates video camera 113 or microphone 114 via a legitimate API or an inserted driver to receive information from these input devices via their interface circuits. The bug routine may immediately transmit this information to intruder computer system 120 via WAN 117 or may store it in memory 101 for later transmission to intruder computer system 120.

FIG. 2 illustrates the software components that would be present in a Windows™ operating system environment and other operating system environments for performing bugging operations and also to perform the bugged detection operations. Authorized drivers 204-206 are the authorized drivers that exist on user computer system 100 to control and receive digital audio information legitimately from interface circuit 107. Note, that interface circuit 107 maybe physically in computer system 100 or part of microphone 114 and interconnect to computer system 100 via an external communication channel such as but not limited to a Universal Serial Bus (USB).

Authorized drivers 204-206 may be established by API's 209-211. API's 209-211 may be used legitimately by an IP telephony, Net Meeting applications, etc. or illegitimately by an unauthorized routine or application such as bug routine 208. Bugging driver 207 is a driver set up by bug routine 208 to control and receive digital audio information from microphone 114. Bugging driver 207 is inserted into memory 101 of user computer system 100 so that bug routine 208 can fraudulently receive audio digital information. Bug routine 208 may also use API's 209-211 to receive fraudulently audio digital information. Storage 212 may be any type of storage known to one skilled in the art and may be used by to bug routine 208 to store audio digital information for later transmission via WAN interface 109.

Bug detection routine 203 periodically uses driver 202 to interrogate interface circuit 107 to determine when one of drivers 204-206 is actively controlling and receiving digital audio information from interface circuit 107 using techniques well known to those skilled in the art. In the first embodiment where a authorized driver or API is being utilized to fraudulently obtain digital audio information, when bug detection routine 203 determines that such a driver is active and is receiving digital audio output from interface circuit 107, bug detection routine 203 first must determine if the driver is an authorized driver whose activities are being requested by an authorized API. If this is true, bug detection routine 203 determines if more than one authorized application is using the authorized API. If there is more than one authorized application, bug detection routine 203 alerts the user. If there is only one authorized application receiving digital audio information, bug detection routine 203 will still alert the user when this application first starts to receive digital audio information.

If an unauthorized application is using an authorized API, bug detection routine 203 alerts the user and allows the user to terminate the unauthorized application. Bug detection routine 203 also alerts the user if there are more than one authorized driver or API accessing interface circuit 107.

In the other embodiment, intruder computer system 120 inserts bugging driver 207 and bug routine 208 into memory 101 of user computer system 100. Bugging driver 207 and bug routine 208 are unauthorized and not registered on user computer system 100. Bug routine 208 initiates bugging driver 207. Bug detection routine 203 again periodically uses driver 202 to interrogate interface circuit 107 to determine when an unauthorized driver is actively controlling and receiving digital audio information from interface circuit 107. When such an unauthorized driver is detected, bug detection routine 203 attempts to identify the unauthorized driver and gives the user the opportunity to terminate the unauthorized driver and any application or routine using it. Both embodiments would be implemented together.

When bugging process 207 transfers digital audio information to bug routine 208, bug routine 208 may immediately transmit the digital audio information via WAN interface 109 to intruder computer system 120. Also, bug routine 208 may store the digital audio information in memory 101 until an opportune time occurs for the transmission of the digital audio information to intruder computer system 120. In addition, bug routine 208 may compress the digital audio information before transmission to intruder computer system 120.

The detection of video eavesdropping could be performed in a manner similar to that illustrated in FIG. 2 and described with respect to FIG. 2. With the exception that video camera 113 and interface 106 would be utilized rather than microphone 114 and interface 107.

In one embodiment, bug detection routine 203 is a stand alone routine that performs its operation without utilizing other applications. In another embodiment, bug detection routine could be part of a registered application that uses audio information such as an IP telephony application. This could allow the IP telephony application to assure that eavesdropping was not taking place. In yet another embodiment, bug detection routine 203 could be part of a standard virus detection program. As part of a standard virus detection program, bug detection routine 203 would perform its operations as noted above but upon determining an illegal bug routine, such as bug routine 208, it would utilize the resources of the virus application to remove the bug routine and the bugging process from user computer system 100.

Although FIG. 2 is described in terms of the Windows™ software, one skilled in the art could readily envision how these operations would be performed in other operating system environments such as Linux™, Unix™, etc.

FIGS. 3 and 4 illustrate, in flowchart form, the operations performed by bug detection routine 203 of FIG. 2. After being started in block 301, decision block 302 determines if any input audio from a microphone such as microphone 114 is being utilized within the user computer system. If the answer is no, control is returned to decision block 302. If the answer is yes in decision block 302, decision block 303 determines if more than one driver such as drivers 204-207 of FIG. 2 are active. If the answer is no, block 304 sets the variable "number drivers" equal to one and transfers control to decision block 308. If the answer in decision block 303 is yes, block 306 alerts the user of the user computer system to the fact that more than one driver is actively receiving audio and transfers control to block 307. Block 307 sets the "number drivers" variable equal to the active number of drivers that was determined in decision block 303 before transferring control to decision block 308.

Decision block 308 determines if the driver identified by the "number drivers" variable is an authorized driver to be operating on the user computer system. If the answer is no, control is transferred to block 413 of FIG. 4.

If the answer is yes in decision block 308, decision block 309 determines if more than one authorized API is using the driver identified in decision block 308. If the answer is yes, block 311 identifies the APIs that are active, and block 312 alerts the user to the fact that there are more than one API actively using the driver and also supplies the identification information of these APIs to the user before transferring control to block 317.

If the answer is no in decision block 308, decision block 313 determines if more than one authorized application is using the API that is using the identified driver. The API in question was identified in decision block 309. If the answer in decision block 313 is yes, block 314 determines the identity of all the applications that are actively using the API, and block 316 alerts the user and identifies the applications utilizing the information obtained in block 314 before transferring control to block 317. If the answer in decision block 313 is yes, control is transferred to decision block 401 of FIG. 4.

If control is transferred from blocks 312, 316 or connector C from FIG. 4, block 317 sets the "number drivers" variable equal to the "number drivers" variable minus one before transferring control to decision block 318. Decision block 318 determines if the "number drivers" variable is equal to zero. If the answer is yes, control is transferred back to decision block 302. If the answer in decision block 318 is no, control is transferred to decision block 308 so that the next active driver can be evaluated.

Returning to decision block 308, if the answer is no that the driver presently being evaluated is not an authorized driver, control is transferred to block 414. Block 414 alerts the user to the presence of an unauthorized driver before transferring control to decision block 416. Decision block 416 then allows the user to make the determination of whether or not to delete the driver from the user's computer system. If the answer is no, control is returned back to block 317. If the answer is yes in decision block 416, block 417 deletes or removes the driver from the user's computer system before transferring control back to block 317.

Returning to decision block 313 of FIG. 3, if the answer is no in decision block 313, control is transferred to decision block 401 of FIG. 4. Decision block 401 determines if an unauthorized application is using an authorized API that is using the driver previously identified in decision block 308. If the answer in decision block 401 is yes, block 402 alerts the user to this fact before transferring control to decision block 403. Decision block 403 gives the user the ability to terminate the application and in one embodiment to remove the application from the user's computer system. If the answer in decision block 403 is yes, block 404 terminates the application or removes the application from the computer system before transferring control back to block 317 of FIG. 3. If the answer in decision block 403 is no, control is transferred back to block 317.

Returning to decision block 401, if the answer in decision block 401 is no, decision block 406 determines if an unauthorized routine is using an authorized driver that was identified in decision block 308. If the answer is no, control is transferred to decision block 411.

If the answer in decision block 406 is yes, block 407 alerts the user before transferring control to decision block 408. Decision block 408 allows the user to determine whether or not to delete or remove the routine from the user's computer system. If the answer in decision block 408 is no, control is transferred back to block 317. If the answer in decision block 408 is yes, block 409 deletes or removes the routine from the user's computer system before transferring control to block 317 of FIG. 3.

Returning now to decision block 406, if the answer in decision block 406 is no control is transferred to decision block 411. Decision block 411 determines if this is the first use of the driver, which has been previously determined to be an authorized driver, by an authorized API and an authorized application. If the answer is yes, block 412 alerts the user before transferring control back to block 317 of FIG. 3. If the answer in decision block 411 is no, control is transferred back to block 317 of FIG. 3.

When the operations of personal computers, servers, or systems are implemented in software, it should be noted that the software can be stored on any computer-readable storage medium for use by or in connection with any computer related system or method. In the context of this document, a computer-readable storage medium is an electronic, magnetic, optical, or other physical device or means that can contain or store a computer program for use by or in connection with a computer related system or method. The personal computers, servers, or systems can be embodied in any computer-readable storage medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. For example, the computer-readable storage medium can be, but is not limited to, an electronic, magnetic, optical, electromagnetic, infrared, or semiconductor system, apparatus, or device. More specific examples (a non-exhaustive list) of the computer-readable storage medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the stations, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for preventing eavesdropping via by a detector module executing on a computer, comprising:
   establishing by the computer detector module that a interface circuit interconnected to a device is providing at least one of audio or visual input information is active;
   further establishing by the computer detector module that only one driver is controlling the interface circuit and is authorized to control the interface circuit;
   alerting by the computer detector module if more than one authorized driver is controlling the interface circuit and;
   further alerting by the computer detector module if the driver controlling the interface circuit is unauthorized.

2. The method of claim 1 wherein the alerting further comprises allowing a user to terminate the unauthorized driver.

3. A method for preventing eavesdropping via by a detector module executing on a computer, comprising:
   detecting by the computer detector module a use of at least one of audio or visual input information by a software entity;
   determining by the computer detector module if no more than one authorized application programming interfaces are receiving the input information from an authorized driver that is receiving the input information; and
   alerting by the computer detector module if more than one authorized application programming interfaces are receiving the input information.

4. The method of claim 3 wherein the determining further comprises determining if an unauthorized application programming interface is receiving the input information from the authorized driver that is receiving the input information; and the alerting further alerting if the unauthorized application programming interface is receiving the input information.

5. The method of claim 4 wherein the alerting further comprises allowing a user to terminate the unauthorized application programming interface.

6. The method of claim 1 further comprises determining if an unauthorized software routine is receiving the input information from the authorized driver that is receiving the input information; and the alerting further alerting if the unauthorized software routine is receiving the input information.

7. The method of claim 6 wherein the alerting further comprises allowing a user to terminate the unauthorized software routine.

8. A non-transitory computer-readable storage medium for preventing eavesdropping via by a detector module executing on a computer, comprising computer-executable instructions executed by the computer detector module configured for: establishing that a interface circuit interconnected to a device is providing at least one of audio or visual input information is active;
further establishing that only one driver is controlling the interface circuit and is authorized to control the interface circuit;
alerting if more than one authorized driver is controlling the interface circuit and; further alerting if the driver controlling the interface circuit is unauthorized.

9. A non-transitory computer-readable storage medium for preventing eavesdropping via by a detector module executing on a computer, comprising computer-executable instructions executed by the computer detector module configured for: detecting a use of at least one of audio or visual input information by a software entity; determining if no more than one authorized application programming interfaces are receiving the input information from an authorized driver that is receiving the input information and alerting if more than one authorized application programming interfaces are receiving the input information.

10. The non-transitory computer-readable storage medium of claim 9 wherein the computer-executable instructions for determining further determining if an unauthorized application programming interface is receiving the input information from the authorized driver that is receiving the input information; and the computer-executable instructions for alerting further alerting if the unauthorized application programming interface is receiving the input information.

* * * * *